United States Patent [19]
Miller

[11] Patent Number: 5,554,355
[45] Date of Patent: Sep. 10, 1996

[54] OXIDE SLURRY FOR INDUSTRIAL PROCESS APPLICATIONS

[75] Inventor: Thomas Miller, Walnut, Calif.

[73] Assignee: PSC Technologies, Inc., King of Prussia, Pa.

[21] Appl. No.: 443,566

[22] Filed: May 18, 1995

Related U.S. Application Data

[63] Continuation of Ser. No. 83,421, Jun. 28, 1993, abandoned.

[51] Int. Cl.$^6$ .................. C01B 9/02; C01B 9/08; C01B 17/96

[52] U.S. Cl. .............. 423/489; 210/724; 210/912; 423/490; 423/491; 423/497; 423/554; 423/555; 423/659; 423/DIG. 1; 423/DIG. 2

[58] Field of Search .................... 423/497, 554, 423/555, 659, DIG. 1, DIG. 2, 489, 490, 491; 210/724, 912

[56] References Cited

U.S. PATENT DOCUMENTS 3,617,562  11/1971  Cywin et al. ............... 423/DIG. 1
5,223,239  6/1993  Moran et al. ............... 423/640

FOREIGN PATENT DOCUMENTS 112426  5/1988  Japan ................. 423/DIG. 1

OTHER PUBLICATIONS

Metalfab, Inc., Vernon, New Jersey, *Instructions for Operation and Maintenance, Model DB1C (Compact) Volumetric Screw Feeder* (5 pages).
GD-ANKER/MAI-PUMP, Ges.m.b.H. A-9872 Millstatt-Austria, MAI-Mortarpump M-250 (1 page).
Silotec Brochure of Mortar System (Brochure — 4 pages).
Tarby Replacement Rotors and Stators (Brochure — 1 page).

*Primary Examiner*—Wayne Langel
*Attorney, Agent, or Firm*—Ostrolenk, Faber, Gerb & Soffen, LLP

[57] ABSTRACT

A method and apparatus for forming a slurry of metal oxide in a mineral or the like (e.g. of magnesium or calcium oxide) and introducing the slurry to an acid neutralization process in a time period before substantial hydration of the oxide has occurred.

22 Claims, 5 Drawing Sheets

OXIDE SLURRY FOR INDUSTRIAL PROCESS APPLICATIONS

This is a continuation of application Ser. No. 08/083,421 filed on Jun. 28, 1993, now abandoned.

BACKGROUND OF THE INVENTION

1. Field of the Invention

The present invention relates to the use of a slurry of a metal oxide in processes that require mineral oxides or hydroxides. More particularly, the invention relates to methods for introducing a metal oxide slurry, such as magnesium oxide slurry or calcium oxide slurry, into an industrial process that allows the oxide to be used in the process as a source of alkalinity. The invention also relates to an apparatus for making and introducing a mineral oxide slurry into such a process.

2. Description of the Background Art

Mineral oxides and hydroxides (e.g. minerals containing various metal oxides (or hydroxides)) are frequently used in industrial processes. For example, magnesium and calcium compounds, such as their oxides and hydroxides, are used extensively in the power, mining, water treatment, paper and pulp, petro-chemical, agricultural and pollution control industries. In most instances, such mineral oxide and hydroxide compounds are used as a source of alkalinity in acid neutralization systems and for adjusting the pH in a process.

Processed mineral oxides are generally 30 to 60% less expensive on a delivered equivalency basis than their hydroxide form. For example, pound for pound, magnesium oxide powder is nearly three times more effective than magnesium hydroxide slurry. Moreover, because of the greater volume and weight of an equivalent amount of hydroxide slurry, transportation and handling costs for materials in the dry oxide form are substantially lower than for the hydroxide slurry. A dry mineral hydroxide, on the other hand, is more expensive than the mineral oxide because of the additional cost of removing water after manufacture of the mineral hydroxide.

On the other hand, material handling problems associated with the dry oxide such as bridging, dust control, plugging, abrasion and equipment reliability cause high overall operating costs when such dry oxide reagents are used. In consequence of such material handling difficulties for dry mineral oxides, the direct introduction of dry oxides into industrial, agricultural and environmental processes is limited. In the prior art, dry mineral oxides, which are sometimes delivered to a user to reduce the transportation costs associated with the hydroxide slurry, are then mixed with water by the user to hydrate the oxide. The hydroxide, in slurry form, is then introduced into the process being performed. This avoids some of the aforementioned material handling problems.

The addition of water or an aqueous solution to mineral oxides, however, produces an exothermic hydration reaction known commonly as slaking. Reactive mineral oxides undergo strong exothermic hydration when they are mixed with water. During such hydration, the reacting mixture of mineral oxide and water becomes viscous and hot. Consequently, the hydration reaction needs working through, which requires slaking equipment, e.g. high horsepower mixing equipment, an auxiliary heat source for faster initiation of hydration, safety equipment for operators, and the like. Slaking equipment is expensive and maintenance intensive. Further, the hot viscous mixture produced during slaking can be dangerous to operating personnel.

Accordingly, each of the methods presently used for introducing a mineral oxide or hydroxide into an industrial process suffers from at least one of the foregoing drawbacks. There is, therefore, a need for a more cost effective and reliable method for introducing mineral oxide powders, such as magnesium oxide powder and calcium oxide powder, into process applications.

While equipment is available for mixing and pumping cements, to applicants' knowledge no such equipment has been used for delivering mineral oxide slurry for reaction in further industrial processes in accordance with the present invention.

SUMMARY OF THE INVENTION

It is an object of the present invention to provide a method of introducing into a chemical process a mineral oxide slurry, which is made by wetting a dry mineral oxide powder with water and mixing to form slurry, and then quickly pumping the oxide slurry to a chemical process in a safe, efficient and reliable way before substantial hydration of the mineral oxide by the water has occurred.

It is a further object of the present invention to provide a method of introducing a mineral oxide to an industrial process while by-passing a preliminary hydration step, thus resulting in safer and less expensive application of the mineral oxide reagent to the process. The use of a mineral oxide slurry also eliminates the need for slaking equipment and holding tanks.

It is another object of the present invention to provide an apparatus for making a slurry of a mineral oxide powder and then moving the slurry to a process requiring the oxide or the hydroxide of the mineral. The methods and apparatus of the present invention are intended for use in chemical processes that require a mineral oxide or hydroxide. Accordingly, the methods and apparatus may be used in any of the chemical processes which heretofore have used a mineral oxide or hydroxide.

It is another object of the present invention to provide a method of introducing a mineral oxide slurry into a process requiring a source of alkalinity, such as a pH-raising process or an acid neutralization process by weighing, mixing and pumping the oxide powder to the process in a slurry form before substantial hydration of the metal oxides of the slurry has occurred.

It is a further object of the present invention to provide a method to easily and efficiently introduce unhydrated magnesium and/or calcium oxide powder directly into a process as essentially dust free oxide slurry.

It is still a further object to provide an apparatus for weighing, mixing and pumping before hydration, a slurry of magnesium oxide powder to a pH-raising process.

The above and other objects of the present invention are achieved by providing the methods and equipment described herein.

In one aspect, the invention provides an acid neutralization process comprising the steps of: contacting an unhydrated metal oxide with water or an aqueous solution to create an aqueous metal oxide mixture; and transferring said aqueous metal oxide mixture to a reaction vessel containing an acidic solution such that said aqueous metal oxide mixture is contacted with said acidic solution to cause acid neutralization before substantial hydration of the metal oxide has occurred.

In another aspect, the invention provides a method of introducing magnesium oxide powder to a reaction zone for reacting with an acidic solution, comprising the steps of: contacting dry magnesium oxide powder with water or an aqueous solution to form an aqueous magnesium oxide mixture of the magnesium oxide and the water or aqueous solution; transferring said aqueous magnesium oxide mixture to a reaction zone containing an acidic solution; and contacting said aqueous magnesium oxide mixture with said acidic solution to cause acid neutralization, before substantial hydration of said magnesium oxide mixture has occurred.

In another aspect, the invention provides an acid neutralization process comprising the steps of: contacting an unhydrated mineral oxide with water or an aqueous solution to create an aqueous mineral oxide mixture; and transferring said mixture, in the absence of cooling or slaking equipment, to a reaction zone containing an acid solution and contacting said aqueous mineral oxide mixture with said acid solution before sufficient hydration of said mineral oxide has occurred to raise the temperature of said mixture above 175° F.

In another aspect, the invention provides an apparatus for introducing a metal oxide slurry into a reaction vessel comprising: feeding means for feeding unhydrated metal oxide into a mixing chamber; delivery means for delivering water or an aqueous solution to the mixing chamber; mixing means within said mixing chamber for mixing the water and the metal oxide powder to form a slurry; and transfer means for moving the slurry to said reaction vessel at a rate of speed sufficient for said slurry to reach said reaction vessel before substantial hydration of said metal oxide has occurred.

Other features and advantages of the present invention will become apparent from the following description of the invention which refers to the accompanying drawings.

BRIEF DESCRIPTION OF THE DRAWINGS

The invention will now be described in greater detail in the following detailed description with reference to the drawings in which.

DETAILED DESCRIPTION OF THE INVENTION

The present invention provides a novel approach for using magnesium oxide, calcium oxide and/or other oxides in an industrial process. A slurry of the mineral oxide may be used in any suitable industrial process in which the oxide or the hydroxide of the mineral have been used heretofore. Moreover, the apparatus of the present invention may be installed in parallel with existing process equipment.

The concept of injecting a mineral oxide slurry into an industrial process is in itself novel. The apparatus for making and introducing unhydrated mineral oxide slurry directly into a neutralization process in a time period that substantially prevents hydration of the mineral oxide prior to injection, is novel since it requires no slaking equipment or slurry holding tanks.

The mineral oxide slurry of the invention has applicability, in particular, to acid neutralization processes with or without the precipitation of metals. Such chemical processes include, but are not limited to, those of the power, mining, water treatment, paper and pulp, petro-chemical, agricultural and pollution control industries. For example, the present invention has applicability to processes requiring a source of alkalinity such as acid neutralization systems and pH-raising processes, e.g. for the neutralization of acid by-products of industrial processes. These processes may involve any of the acids commonly utilized or generated in industrial processes, including, but not limited to, sulfuric acid, hydrochloric acid, hydrofluoric acid, and so forth. In particular, the present invention has applicability to industrial processes, such as the manufacture of epsom salts ($MgSO_4$), and environmental processes, such as the remediation of heavy metals from soils, that generate metal bearing acidic solutions such as, for example, a metal bearing sulfuric acid solution.

The acidic solutions may contain any of the metals that are encountered in such processes, including but not limited to copper, any of the heavy metals such as lead, zinc, cadmium, and so forth. Heavy metals are metals having a specific gravity greater than 4. In particular, the present invention has special applicability in acid neutralization processes, in the precipitation of metals from metal bearing acids, in the manufacture of epsom salts, in the treatment of water leaching through abandoned mines, or any other process requiring a safe, easy and reliable method and apparatus for conveying and introducing a mineral oxide slurry to the process.

Instead of providing mineral oxides in a hydroxide form, a hydroxide slurry form, or in a dry oxide powder form, the metal oxide (as a dry powder) is first mixed with a liquid, such as water or an aqueous acidic solution, converted into an aqueous slurry, and then pumped to the industrial process before substantial hydration of the mineral oxide can occur. Consequently, heat and viscosity increases associated with hydration are reduced because no substantial reaction of the mineral oxide with the water to form a hydroxide occurs before the slurry is introduced into the acid it is to neutralize.

The slurry is transferred to a reaction vessel and mixed with acid before substantial hydration of the mineral oxide by the water has occurred, and before the viscosity increase associated with hydration exceeds the equipment's ability to transport the slurry. Viscosity is preferably maintained below 100,000 cp, more preferably below 40,000 cp and especially below 15,000 cp. Preferably the transport occurs before the exotherm of the reaction raises the temperature of the slurry above 175° F. and most preferably before 140° F. Hydration causes solids content to increase, and transfer is preferably completed before solids content exceeds 80% by weight relative to the total weight of the slurry and most preferably before it exceeds 70%. The reaction time for hydration of a mineral oxide is dependent on various factors such as the degree of reactivity of the grade of mineral oxide used, temperature of the liquid added to the mineral oxide, the environment for the chemical reaction, and so forth. Therefore, a time period used in the method of the present invention must be determined in view of all the aforementioned parameters for the hydration reaction. At the point that substantial hydration of the mineral oxide has occurred, the hydration reaction causes the reacting mixture to become very viscous and the temperature of the mixture to be raised close to or above the boiling point of water.

The time period for pumping the slurry, i.e., the time period from formulation of the slurry till introducing it into the process, should not, in most instances, exceed one hour. Preferably, the time period is less than 20 minutes. More preferably, the time period is less than 2 minutes (e.g. about 1 minute or less). Accordingly, in certain instances the mixture of the mineral oxide and the liquid is moved to the process immediately subsequent to contact of the mineral oxide by the liquid. In a preferred embodiment, the slurry is mixed for no more than five seconds before the transfer to the neutralization process begins. In all instances, the mixture is introduced to the neutralization process before the mixture becomes too viscous to be moved.

This slurry method of introducing a mineral oxide into an industrial process provides an easy and inexpensive way to achieve the results previously obtained by providing the hydroxide of the mineral, or previously the mineral oxide in dry powder form. The mineral oxide in dry powder form is weighed and mixed with any liquid suitable for mixing and conveying the mineral oxide to the neutralization process. For example, an acidic solution, such as an aqueous solution of sulfuric acid may be used to form a slurry of the mineral oxide powder. The mineral oxide may be formed into slurry having the mineral oxide in a range from about 10% by weight to about 70% by weight of the mineral oxide relative to total weight of the slurry. Preferably, the mineral oxide and water or aqueous solution are mixed in a ratio of 50:50, by weight.

Figure 1:
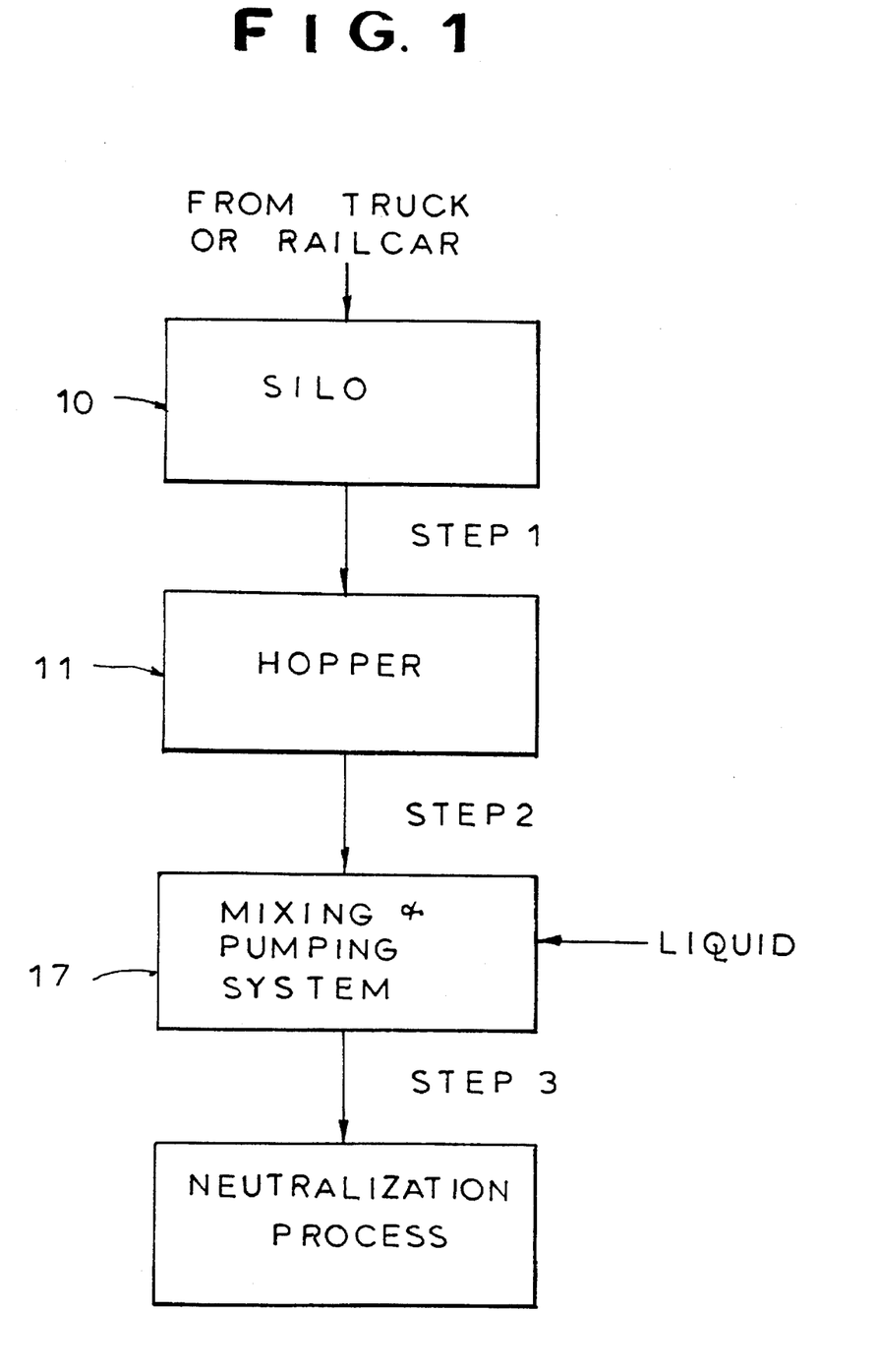
FIG. 1 shows the basic steps of one preferred method according to the invention and for the storage of mineral oxide prior to use in the method.
Figure 2:
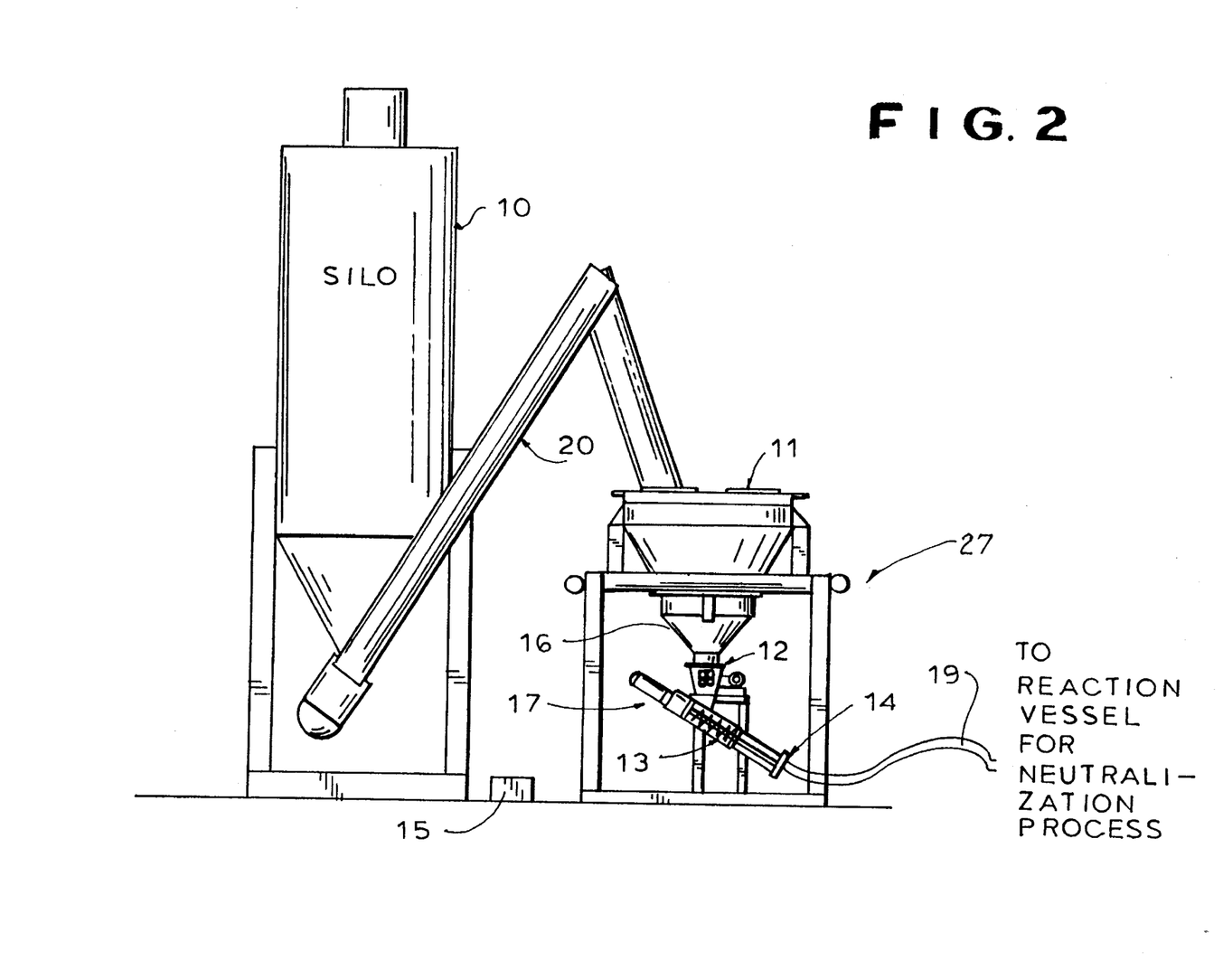
FIG. 2 is a plan view of one apparatus that can be used in the method of the invention.

As shown in FIGS. 1 and 2, the method of the invention includes conveying from a storage silo 10 into a weighing hopper 11, dry powder mineral oxide, which is stored in the silo 10 (Step 1). Dry mineral oxide powder may be pneumatically transferred, from truck or rail cars (not shown) transporting the mineral oxide powder, into a suitable silo 10 for storage until the mineral oxide powder is required for use in an industrial process. Any type of silo 10 that insures the mineral oxide powder is kept dry may be used.

A screw feed 20 may be used to convey the dry mineral oxide powder from the silo 10 to the weighing hopper 11. Such screw feeds are well known in the art and will not be described in detail here. The dry mineral oxide powder is then conveyed from the weighing hopper 11 to a mixing and pumping system 17 (Step 2), and in particular to a mixing chamber 13 within the mixing and pumping system 17 by for example a variable speed screw which is also well known in the art. Inside the mixing chamber, water is added to the metal oxide and intermixed therewith to form slurry. Almost immediately, the slurry is pumped by a pump assembly 14, which is attached and in fluid communication with the mixing chamber, so as to be moved to an industrial neutralization process. The slurry is introduced into the industrial process through, preferably, a flexible hose 19 (Step 3). The time period between addition of water to the dry mineral oxide powder so as to form slurry and pumping of the slurry to the process is controlled so that the mineral oxide is substantially prevented from being hydrated to the hydroxide form. Accordingly, the exothermic hydration reaction is substantially prevented. In consequence, the slaking equipment and the storage tanks, which are necessary in the methods of the prior art to work through the hydration reaction, are not required.

An apparatus, discussed below, is provided for carrying out the method of the invention. Controls are provided in the apparatus to purge the unit of mixed slurry prior to shutting off the mixing and pumping system. Since reactive mineral oxides, such as magnesium oxide and calcium oxide, react with water relatively quickly, any system for mixing and pumping such slurries requires a very short time between the introduction of the water and delivery of the slurry into the process. In the method of the present invention, for example, a good grade of reactive magnesium oxide powder, such as Magox® 93 HR-325 mesh, is used. Such magnesium oxide, or a comparable product with a surface area not less than 20 $m^2/gm$, preferably 35 $m^2/gm$ or higher, is made into a slurry and pumped to a neutralization process in less than 1 hour. Preferably the elapsed time is less than 20 minutes and most preferably less than 2 minutes (e.g. less than 1 minute). Other metal oxides may be used (e.g. a blend of magnesium and calcium oxide, e.g. a blend containing from 30% to 40% by weight (of the blend) magnesium oxide.

Figure 3A:
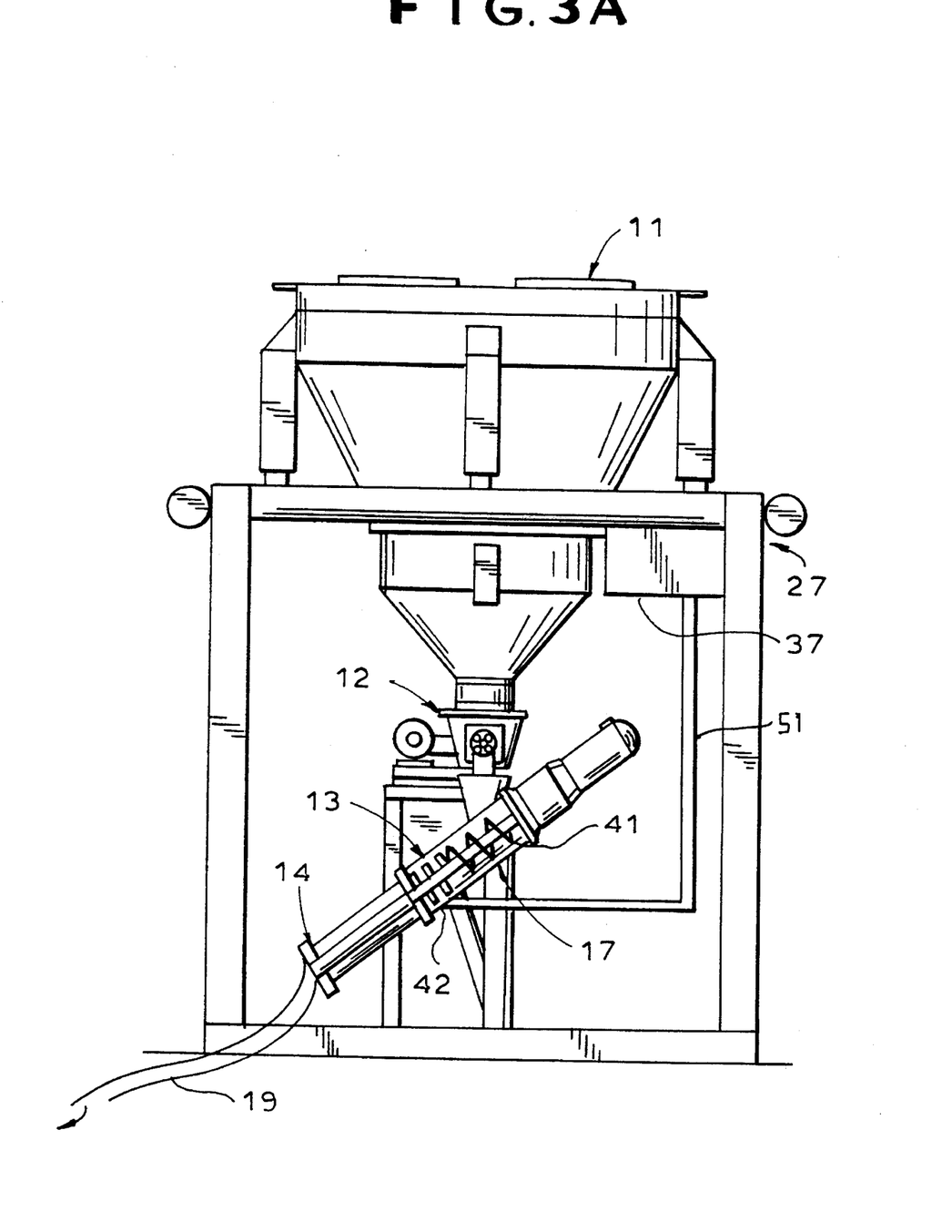
FIGS. 3(A) and 3(B) are plan views of the apparatus of FIG. 2, FIG. 3B being a side view of the apparatus of FIG. 3A.
Figure 3B:
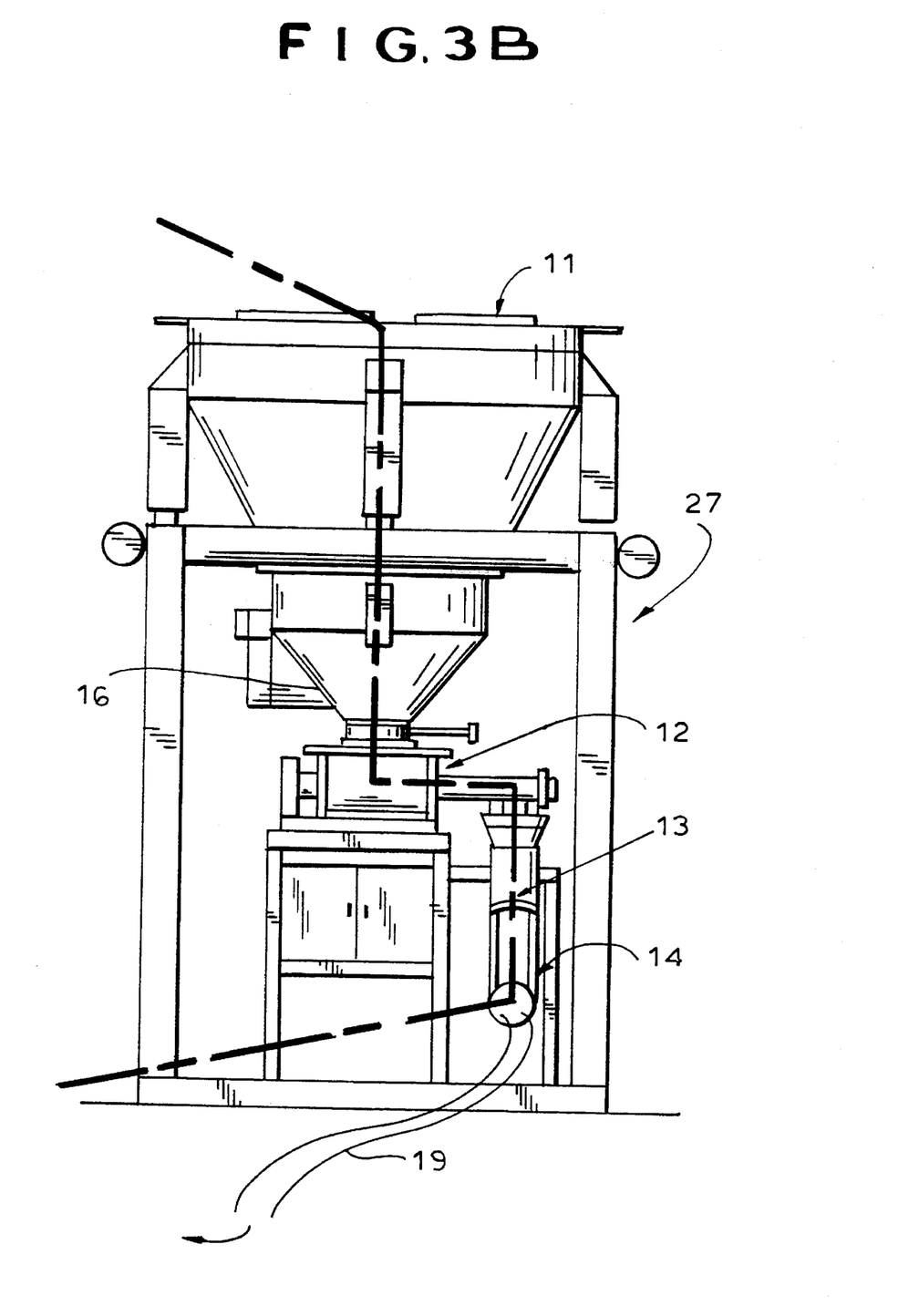
Figure 4:
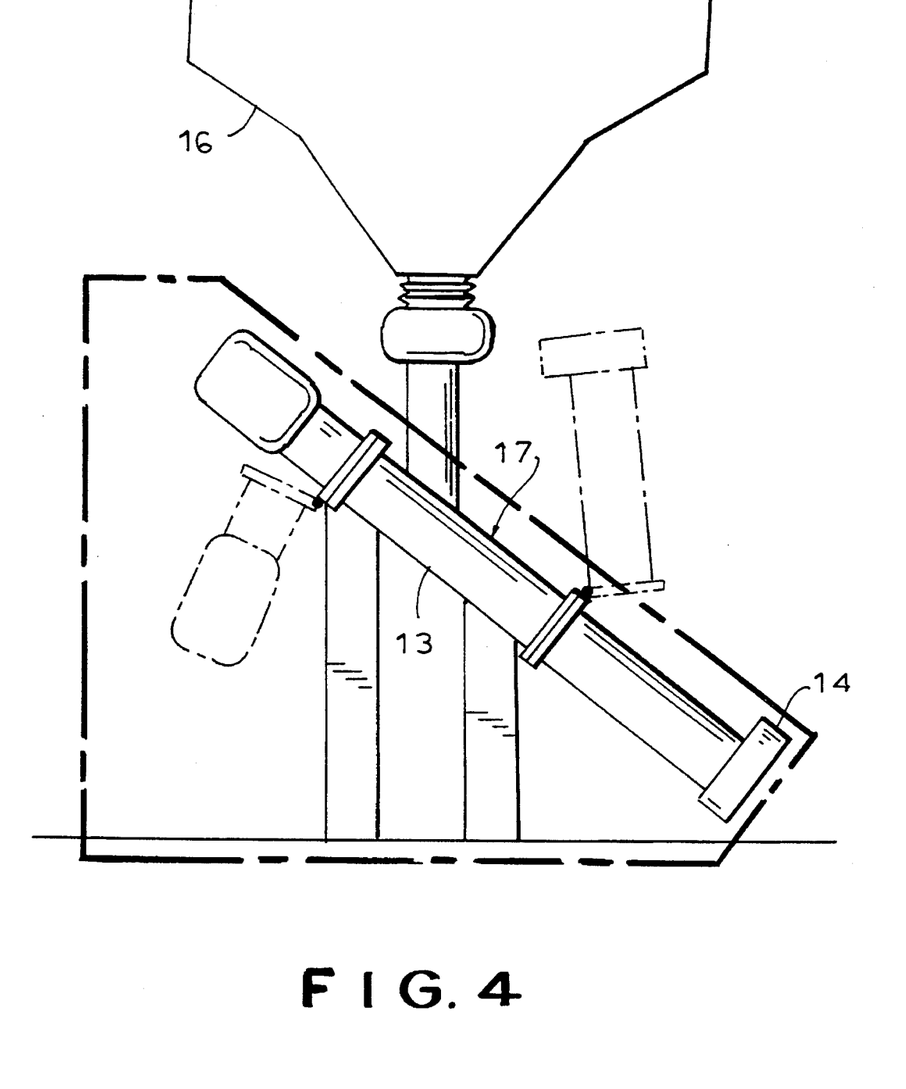
FIG. 4 is a plan view of the mixing and pumping unit of the apparatus of FIG. 2.

FIGS. 3(A) and 3(B) show one preferred apparatus 27 of the invention having a weighing hopper 11 that is supplied by the main supply silo (10 of FIG. 2) for receiving and storing dry mineral oxide powder. The hopper 11 may be, for example, a 70 cuft hopper made by Metalfab, Inc. of Vernon, N.J. A powder feed 12 is located under the hopper 11. The powder feed 12 feeds mineral oxide from the hopper 11 to a mixing chamber 13. A powder feed such as Model DBIC (Compact) Volumetric Screw Feeder made by Metalfab, Inc., Vernon, N.J., may be used in the practice of the invention. The mixing chamber 13, supplied with the dry mineral oxide powder by a powder feed screw of the powder feed 12, is driven by, for example, a 7.5 HP motor with a gear box. A mixing chamber such as available from Highway Manufacturing, Bettsville, Ohio, may be used. Water is injected into the lower section of the mixing chamber 13 by supply line 51 from water train 37. A suitable water train 37 for the practice of the invention includes, for example, a shut-off valve, a pressure proving switch, a reducing regulator, a solenoid valve, a flow meter and a metering valve and other items commonly used in the industry. However, any suitable water train that is able to deliver the liquid required for mixing with the mineral oxide may be used.

Screw 41 feeds the ingredients to be mixed into chamber 13 where paddles 42 mix the aqueous solution and metal oxide into a slurry. For example, the mixture may be mixed for less than five seconds before pumping to the neutralization process. The mixture may be mixed for a longer period only if it is not to be moved immediately to the process, but generally less than one hour. Since the present invention does not use the slaking and agitating equipment required in the prior art, the holding time of the mixture should be limited so that the mixture can be introduced to the neutralization process before it becomes too viscous to be moved by the pumping arrangement of the system.

The slurry formed in the mixing chamber 13 is then pumped by a pump 14, in fluid connection with the mixing chamber 13, to a flexible hose 19 leading to a reaction vessel (not shown) holding the acid solution with which the slurry is combined in the neutralization process. The hose preferably terminates above the acid solution in a position from which the slurry can fall into the solution. Fluid communication with the acid solution is preferably avoided to avoid backup of the acid in the direction of the mixing chamber 13. The pump 14 may be, for example, a progressing cavity type pump. Preferably, the pump 14 is driven by the same shaft as the mixing screw of the mixing chamber 13. A progressing cavity type pump such as manufactured by Moyno, Netzsch, Strong, Roper or Tarby may be used in the practice of the invention. Any constant displacement pump capable of pumping a high solid slurry may be used.

Controls 15 are located in a remote cabinet to prevent vibration damage from a bin activator 6. The controls 15 (see FIG. 2) may include, for example, standard sequencing, speed and overcurrent protection for the pump motor, powder feed, water solenoid, weighing system, alarms and refilling system. The bin activator 16, which is located on the hopper assembly 11, is an eccentric weighted motor, specifically designed as a vibration device to ensure smooth material flow through the hopper 11. Such a bin activator may be obtained from Metalfab, Inc., Vernon, N.J.

The water train 37, which is provided for feeding water into the mixing chamber 13, preferably includes flow metering and pressure control valves, together with a water pressure proving switch which interlocks the mixing chamber 13 and pump drive of the pump 14 to prevent them from running without water.

The apparatus of the present invention has no storage tank or accumulator between the mixing chamber 13 and the pump 14. In consequence, a consistent mineral oxide slurry can be quickly delivered in a time period that allows little or no hydration of the mineral oxide to occur. Such direct mineral oxide slurry injection into an industrial process is novel since it requires no slaking equipment or slurry holding tanks. The use of a flexible hose 19 (e.g. a 400 psi hose about 2 inches in diameter) as a flexible means of conveying the oxide slurry into the neutralization process reduces the incidence of plugging when compared with a rigid pipe, although rigid pipe may also be used. It has been found that a flexible hose prevents the mineral oxide slurry from depositing solid material onto the walls of the hose. The mixture used in the apparatus to form a slurry contains, for example, dry —325 mesh magnesium oxide powder mixed with water or an aqueous solution in a ratio of from about 10% to about 70% magnesium oxide, by weight, relative to the weight of the magnesium oxide mixture. Preferably, the magnesium oxide powder and water or aqueous solution are mixed in a 1:1 ratio, by weight. The resulting slurry is then pumped to the neutralization process.

The apparatus may operate on, for example, a 10 minute duty cycle, where the time of operation varies with the pH of the acid to be neutralized. At a low pH, the percentage of the 10 minutes that the apparatus supplies slurry increases. At a higher pH, the human operator or automatic pH monitoring equipment would set a lower percentage of time. An additional hopper refill period of, for example, 30 seconds may be provided to allow the silo to replenish the hopper 11 after each cycle. As an example, if the operator calls for 40%, the unit will feed dry mineral oxide powder and hence mineral oxide slurry for four minutes. At the conclusion of the "ON" cycle, the apparatus purges for 90 seconds (pumping only water to clear out the line) and then shuts down and waits for the next cycle.

It is preferred that the apparatus be checked daily to ensure proper operation. The most common cleaning items are the mixing chamber 13, screw of the powder feed 12 and pump 14. In the mixing chamber 13, hardened mineral oxide will, from time to time, build up on the side walls of the mixing chamber 13. This is only a problem when it interferes with the water passing through, or with the removal of the mixing screw for maintenance. The mixing screw can become filled with powder or hardened mineral oxide. This is only a problem when it impedes the flow of powder or water therethrough. Cleaning the mixing screw, therefore, is periodically required. Cleaning can be done, for example, by a sharp rap from a dead blow hammer.

Preferably, standard alarms used in the industry are used to signal the apparatus controller under two circumstances: First, under normal operation, the unit will alarm when progressing cavity wear parts of the pump 14 require maintenance. Second, when the amount of powder flowing out of the hopper 11 during a feed cycle is below a preset minimum.

The pump 14 preferably has, for example, a fully rated capacity of 25 gallons per minute. Preferably, a water flow of not less than 10 gallons per minute should be maintained to ensure low viscosity at high powder feed rates. When new, the pump 14 is preferably capable, for example, of roughly of 6,000 pounds per hour.

The method of the invention provides advantages over the use of hydroxide, or alternately slaked oxide, forms of the mineral because shipping costs for the hydroxide or slaked oxide via truck or rail are expensive. The method of the invention eliminates this expense and reduces the water introduced to the industrial process or system by 50%. No storage tanks or agitation of the mineral oxide mixture is required. With the present invention there is no power consumption for operating equipment during shut-downs. Since the apparatus of the invention can be manually purged, power or mechanical failure holds no threat of solidification in the storage tanks, process piping, or mixing equipment. No slaking equipment is required providing a safer, less expensive operation. The method and apparatus of the invention do not require suspension agents, thereby, yielding better precipitation of the dissolved materials together with improved sludge characteristics. It is anticipated that the method and apparatus of the present invention can utilize the process liquid directly, or an ancillary reactant for introducing to the reaction vessel. This would completely eliminate the introduction of any water to the industrial process or system.

In accordance with the invention, a soluble salt of the metal oxide is formed as a by-product of the acid neutralization.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An acid neutralization process comprising the steps of:

contacting a reactive, unhydrated metal oxide with water or an aqueous solution to create an aqueous metal oxide mixture having from about 10% to 70% by weight of the metal oxide, relative to the total weight of the mixture; and transferring said aqueous metal oxide mixture to a reaction vessel containing an acidic solution such that said aqueous metal oxide mixture is contacted with said acidic solution to cause acid neutralization before substantial hydration of the metal oxide has occurred.

2. The method of claim 1, wherein said mixture is transferred to said reaction zone and contacted with said acidic solution less than 1 hour after creation of said mixture.

3. The method of claim 1, wherein said mixture is transferred to said reaction zone and contacted with said acidic solution less than 20 minutes after creation of said mixture.

4. The method of claim 1, wherein said mixture is transferred to said reaction zone less than 1 minute after creation of said mixture.

5. The method of claim 1, wherein transfer of said mixture to said reaction zone begins at the time said mixture is created.

6. The method of claim 1, wherein the metal oxide comprises magnesium oxide.

7. The method of claim 1, wherein the metal oxide comprises calcium oxide.

8. The method of claim 1, wherein the metal oxide comprises a blend of magnesium oxide and calcium oxide.

9. The method of claim 7, wherein the metal oxide is provided by a mineral having a blend of magnesium oxide and calcium oxide.

10. The method of claim 8, wherein the blend comprises magnesium oxide in the range from 30% to 40%, by weight relative to the total weight of the blend.

11. The method of claim 1, wherein said acidic solution comprises an acid selected from the group consisting of sulfuric acid, hydrochloric acid and hydrofluoric acid.

12. The method of claim 1, wherein said acidic solution includes a metal selected from the group consisting of copper and a heavy metal.

13. The method of claim 1, wherein a soluble salt of the metal oxide is formed as a by-product of said acid neutralization.

14. The method of claim 1, wherein the temperature of said mixture is less than about 175° F. at all times prior to the mixture entering the reaction zone.

15. An acid neutralization process comprising the steps of:

contacting a reactive, unhydrated metal oxide with water or an aqueous solution to create an aqueous metal oxide mixture having from about 10% to 70% by weight of the metal oxide, relative to the total weight of the mixture; and transferring said aqueous metal oxide mixture to a reaction vessel containing an acidic solution such that said aqueous metal oxide mixture is contacted with said acidic solution to cause acid neutralization before substantial hydration of the metal oxide has occurred, wherein the metal oxide and the water or aqueous solution are in a ratio of about 1:1 (w/w).

16. The method of claim 1, wherein the aqueous solution is an aqueous solution of an second reactant for introducing to the reaction vessel.

17. The method of claim 1, wherein the metal oxide has a surface area of not less than about 20 m²/g.

18. The method of claim 1, wherein said mixture is transferred to said reaction zone without use of slaking equipment and before sufficient hydration of said metal oxide has occurred to increase viscosity of said mixture above 100,000 cp.

19. The method of claim 1, wherein said mixture is transferred to said reaction zone without use of slaking equipment and before sufficient hydration of said metal oxide has occurred to increase viscosity of said mixture above 15,000 cp.

20. A method of introducing magnesium oxide powder to a reaction zone for reacting with an acidic solution, comprising the steps of:

contacting dry magnesium oxide powder with water or an aqueous solution to form an aqueous magnesium oxide mixture of the magnesium oxide and the water or aqueous solution, the mixture having from about 10% to 70% by weight of the magnesium oxide, relative to the total weight of the mixture;

transferring said aqueous magnesium oxide mixture to a reaction zone containing an acidic solution; and contacting said aqueous magnesium oxide mixture with said acidic solution to cause acid neutralization, before substantial hydration of said magnesium oxide mixture has occurred.

21. An acid neutralization process comprising the steps of:

contacting a reactive, unhydrated mineral oxide with water or an aqueous solution to create an aqueous mineral oxide mixture having from about 10% to 70% by weight of the mineral oxide, relative to the total weight of the mixture; and transferring said mixture, in the absence of cooling or slaking equipment, to a reaction zone containing an acid solution and contacting said aqueous mineral oxide mixture with said acid solution before sufficient hydration of said mineral oxide has occurred to raise the temperature of said mixture above 175° F.

22. The method of claim 21, wherein said transfer occurs before the temperature of said mixture rises above 140° F.

* * * * *

UNITED STATES PATENT AND TRADEMARK OFFICE
CERTIFICATE OF CORRECTION

PATENT NO. : 5,554,355

DATED : September 10, 1996

INVENTOR(S) : Thomas Miller

It is certified that error appears in the above-identified patent and that said Letters Patent is hereby corrected as shown below:

```
Column 2, line 21, after "form", insert --the--;
          line 28, after "in", insert --a--;
          line 51, after "as", insert --an--.

Column 3, line 47, change "3(A) and 3(B)" to --3A and 3B--.

Column 4, line 44, before "solids", insert --the--;
          line 45, before "solids", insert --the--.

Column 5, line 23, after "into", insert --a--;
          line 26, after "total", insert --the--;
          line 47, after "form", insert --a--;
          line 54, after "form", insert --a--.

Column 6, line 14, change "3(A) and 3(B)" to --3A and 3B--;
          line 66, change "6" to --16--.

Column 7, line 12, after "and", insert --the--;
          line 52, after "screw", insert --41--.

Column 8, line 49, change "vessel" to --zone--.

Column 9, line 40, change "an" (second occurrence) to --a--;
          line 41, change "vessel" to --zone--;
          line 43, change "m²/g" to --m²/gm--.
```

UNITED STATES PATENT AND TRADEMARK OFFICE
CERTIFICATE OF CORRECTION

PATENT NO. : 5,554,355
DATED : September 10, 1996
INVENTOR(S) : Thomas Miller

It is certified that error appears in the above-indentified patent and that said Letters Patent is hereby corrected as shown below:

```
Column 10, line 4, after "increase", insert --the--;
           line 9, after "increase", insert --the--.
```

Signed and Sealed this

Sixteenth Day of June, 1998

Attest:

BRUCE LEHMAN

*Attesting Officer*   *Commissioner of Patents and Trademarks*